United States Patent
Muthusamy et al.

(10) Patent No.: US 6,683,625 B2
(45) Date of Patent: Jan. 27, 2004

(54) SYSTEM AND METHOD FOR ADVANCED INTERFACES FOR VIRTUAL ENVIRONMENTS

(75) Inventors: Yeshwant K. Muthusamy, Plano, TX (US); Jonathan D. Courtney, Richardson, TX (US); Edwin R. Cole, Highland Park, TX (US)

(73) Assignee: Texas Instruments Incorporated, Dallas, TX (US)

( * ) Notice: Subject to any disclaimer, the term of this patent is extended or adjusted under 35 U.S.C. 154(b) by 70 days.

(21) Appl. No.: 09/921,131

(22) Filed: Aug. 3, 2001

(65) Prior Publication Data

US 2002/0080193 A1 Jun. 27, 2002

Related U.S. Application Data

(62) Division of application No. 09/188,995, filed on Nov. 9, 1998, now Pat. No. 6,310,629.
(60) Provisional application No. 60/068,120, filed on Dec. 19, 1997.

(51) Int. Cl.[7] .................................................. G09G 5/00
(52) U.S. Cl. ........................ 345/764; 345/849; 345/851; 704/246; 704/250; 706/55
(58) Field of Search .................. 345/727, 700, 345/764, 848, 849, 978, 851, 751, 753, 757, 758, 759; 704/9, 231, 246, 250, 251, 255; 706/55, 59, 60, 206

(56) References Cited

U.S. PATENT DOCUMENTS

| | | | |
|---|---|---|---|
| 5,006,987 A | | 4/1991 | Harless ........................ 704/275 |
| 5,307,456 A | * | 4/1994 | MacKay ...................... 345/782 |
| 5,563,988 A | | 10/1996 | Maes et al. .................. 345/421 |
| 5,774,628 A | | 6/1998 | Hemphill ..................... 704/255 |
| 5,880,731 A | | 3/1999 | Liles et al. .................. 345/837 |
| 6,057,856 A | | 5/2000 | Miyashita et al. .......... 345/435 |
| 6,088,731 A | | 7/2000 | Kiraly et al. ................ 709/229 |

* cited by examiner

*Primary Examiner*—John Cabeca
*Assistant Examiner*—Cuong T. Thai
(74) *Attorney, Agent, or Firm*—W. James Brady, III; Frederick J. Telecky, Jr.

(57) ABSTRACT

A system and method for providing a controllable virtual environment includes a computer (11) with processor and a display coupled to the processor to display 2-D or 3-D virtual environment objects. Speech grammars are stored as attributes of the virtual environment objects. Voice commands are recognized by a speech recognizer (19) and microphone (20) coupled to the processor whereby the voice commands are used to manipulate the virtual environment objects on the display. The system is further made role-dependent whereby the display of virtual environment objects and grammar is dependent on the role of the user.

3 Claims, 3 Drawing Sheets

SYSTEM AND METHOD FOR ADVANCED INTERFACES FOR VIRTUAL ENVIRONMENTS

This application is a division of Ser. No. 09/188,995, U.S. Pat. No. 6,310,629, filed Nov. 9, 1998 which claims priority under 35 U.S.C. 119 based upon provisional application Serial No. 60/068,120, filed Dec. 19, 1997 expired.

TECHNICAL FIELD OF THE INVENTION

This invention relates to systems that implement a three-dimensional virtual environment in which users can view and manipulate the objects within the virtual environment.

BACKGROUND OF THE INVENTION

This invention pertains to the input interface to a virtual environment (VE), which allows the user to manipulate objects in the environment, and the output interface from the virtual environment, which allows the user to view objects in the environment.

Natural interfaces such as speech and gesture promise to be the best input interfaces for use in such virtual environments, replacing current desktop-oriented devices like the keyboard and mouse which are not as appropriate for virtual environment systems. However, little is known about how to integrate such advanced interfaces into virtual environment systems. Commercial tools exist to construct 3-D "worlds" using objects described with the Virtual Reality Modeling Language (VRML) standard. This constitutes the visual interface to the virtual environment. However, no such tools exist to augment these objects with natural input interfaces most appropriate to immersive visualization, such as speech.

Research prototypes have demonstrated the power of natural interfaces in virtual environments, but this work has not generated methods for constructing natural interfaces to virtual environments that are comparable in power to common methods for building visual interfaces. For example, previous speech interfaces to virtual environments consist of specialized "speech aware" tools within the virtual environment (see for example Jason Leigh et al. article entitled "Multi-Perspective Collaborative Design in Persistent Networked Virtual Environments," in Proceedings of IEEE Virtual Reality Annual Symposium. VRAIS'96, pages 253–260, Santa Clara, Calif., March 1996), and expert systems for mapping voice commands to actions within a specific domain (see for example Mark Billinghurst et al., "Adding Intelligence to the Interface," Proceedings of IEEE Virtual Reality Annual International Symposium, pages 168–175, Santa Clara, Calif.). In both cases, the interface is separate from the objects it manipulates; if the configuration of the objects in the virtual environment changes, the interface must be reconfigured or re-trained. Thus, neither is applicable to rapid construction of flexible virtual environments for general use.

The purpose of this invention is to enable virtual environment creators to embed natural interfaces directly into the objects of the virtual environment. This permits rapid creation of virtual environments, intuitive interaction with virtual objects, and straightforward interface reconfiguration.

SUMMARY OF THE INVENTION

This invention provides a method by which to construct virtual environments in which natural interfaces to the objects are encapsulated within the objects themselves and are therefore built into the environment from the beginning rather than added later.

The invention, according to one embodiment, concerns the integration of speech interfaces within virtual environments. The invention, according to a second embodiment, concerns the integration of gesture interfaces within virtual environments. According to a third embodiment, the invention concerns the use of role-dependent interfaces for manipulating and displaying information within three-dimensional virtual environments.

IN THE DRAWING

DESCRIPTION OF ONE PREFERRED EMBODIMENT OF THE PRESENT INVENTION

Figure 1:
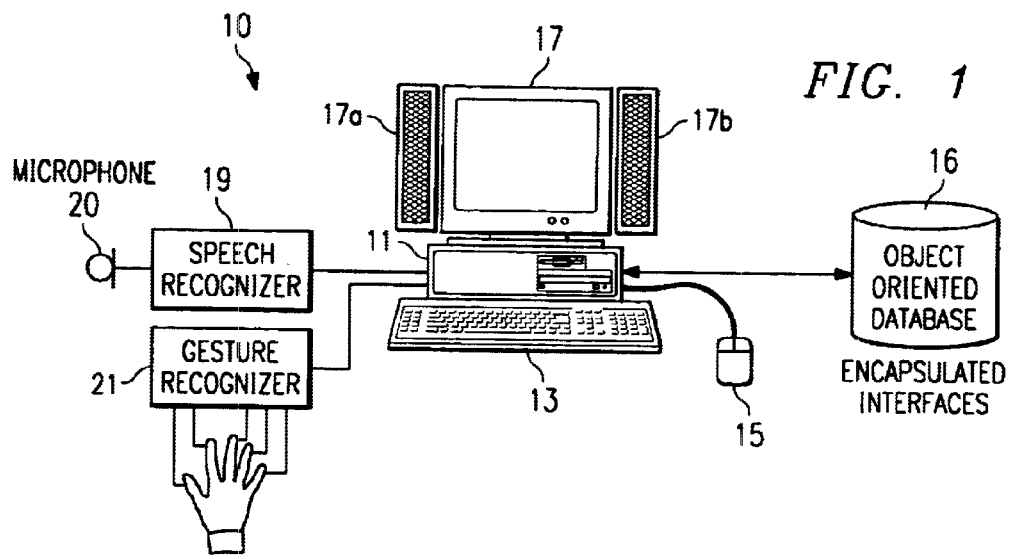
FIG. 1 is a system block diagram according to one embodiment of the present invention.

In accordance with one embodiment of the present invention using a computer system 10 as shown in FIG. 1 comprising a computer 11 with a processor disk drive and a CD ROM. The computer system may not have sufficient memory as it may be connected to a separate database 16. A monitor 17 and speakers 17a are coupled to the computer for providing the images and sound. The computer system 10 in the example would be loaded with a browser program that allows it to view 2-D or 3-D objects using, for example, the Virtual Reality Modeling Language (VRML). The system would also include a speech recognizer 19 and a microphone 20 as primary input, and may include a keyboard 13 and a mouse 15 as backup inputs. The user interacts with the computer 11 via voice command using the microphone 20 and speech recognizer 19. Also, a gesture recognizer 21 with sensors on the hands and/or head may be primary input. Movement of the hands, head, eyes or voice sensors commands are translated to commands to the computer 11 in the same way as keyboard strokes. An example of a gesture sensor is Lewis et al., U.S. Pat. No. 5,177,872 entitled "Method and Apparatus for Monitoring Physical Positioning of a User." This patent is incorporated herein by reference.

This method of integrating natural interfaces with virtual environments begins with the observation that the range of likely operations is not open-ended, but depends greatly upon the objects present in the environment. In a 2-D windowed desktop environment, the operations depend on the Graphic User Interface (GUI) widgets that are visible, such as scrollbars, menus, buttons, etc. These objects define the set of valid operations and provide cues to the user about how to use them. This paradigm can be extended to a 3-D virtual environment. When viewing a virtual environment of a room containing a door, the presence of the door object implies that the speech command to "open the door" is a valid operation.

Therefore, the objects present in a virtual environment collectively afford certain kinds of interaction with the environment. The term affordance comes from the field of cognitive psychology and refers to the usages that an object makes possible. In the case of the affordances of objects within a virtual environment (or "virtual affordances", for short), the information for interacting with a virtual environment should be provided by the objects in the environment rather than stored within a global interface or separate "tool".

This method of augmenting virtual environments with natural interfaces consists of embedding objects with descriptions of valid interactions with the object. In one embodiment, a "door" object contains not only a description of its visual interface (e.g., via VRML), but also a grammar defining the voice commands "open the door", "close the door", etc. This object affords both a particular visual interface as well as a particular speech interface. In another embodiment, this object contains a description of valid gesture commands, such as pushing or pulling the door open.

This is consistent with the way visual interfaces are typically constructed. An object's visual interface is determined by information in the object itself as an attribute (its graphical model), rather than by information in a global interface or separate tool. And, just as an object's visual interface is active only when the object is in the viewer's field of view, the other interfaces to an object are only valid when the object is within the proximity of the user.

Figure 2:
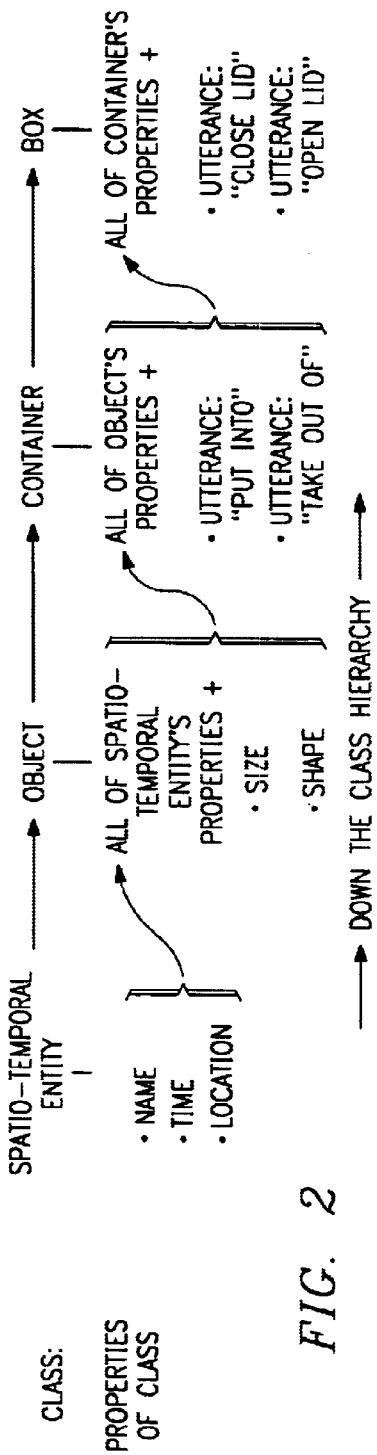
FIG. 2 illustrates affordance inheritance.

This method exploits features of object-oriented modeling to increase the power of virtual affordances. Objects are grouped into classes according to the way they function. For example, virtual objects may be categorized according to classes (or "types"), and may gain features through class inheritance. Thus a "box" is a type of "container", which is a type of "object", which is a type of "spatio-temporal entity". A spatio-temporal entity has a name, a time and a location. Each level in the inheritance path from "spatio-temporal entity" to "box" adds features to those automatically inherited from previous levels. So, as a "spatio-temporal entity", a box could afford speech utterances concerning time and location, and, as a "container", afford utterances related to putting objects "into" or "out of" itself. FIG. 2 illustrates the method of inheritance of affordances for an embodiment using speech recognition. In FIG. 2, the next lower level from spatio-temporal entity is an object that includes all of the spatio-temporal entity properties of name, time and location plus the properties of size and shape. The next lower level is a container that has all of the object's properties plus speech grammars associated with containers such as "put into" and "take out of". The next lower level is a box that has all of the container properties plus the speech grammar for a box such as "close lid" and "open lid".

Figure 3:
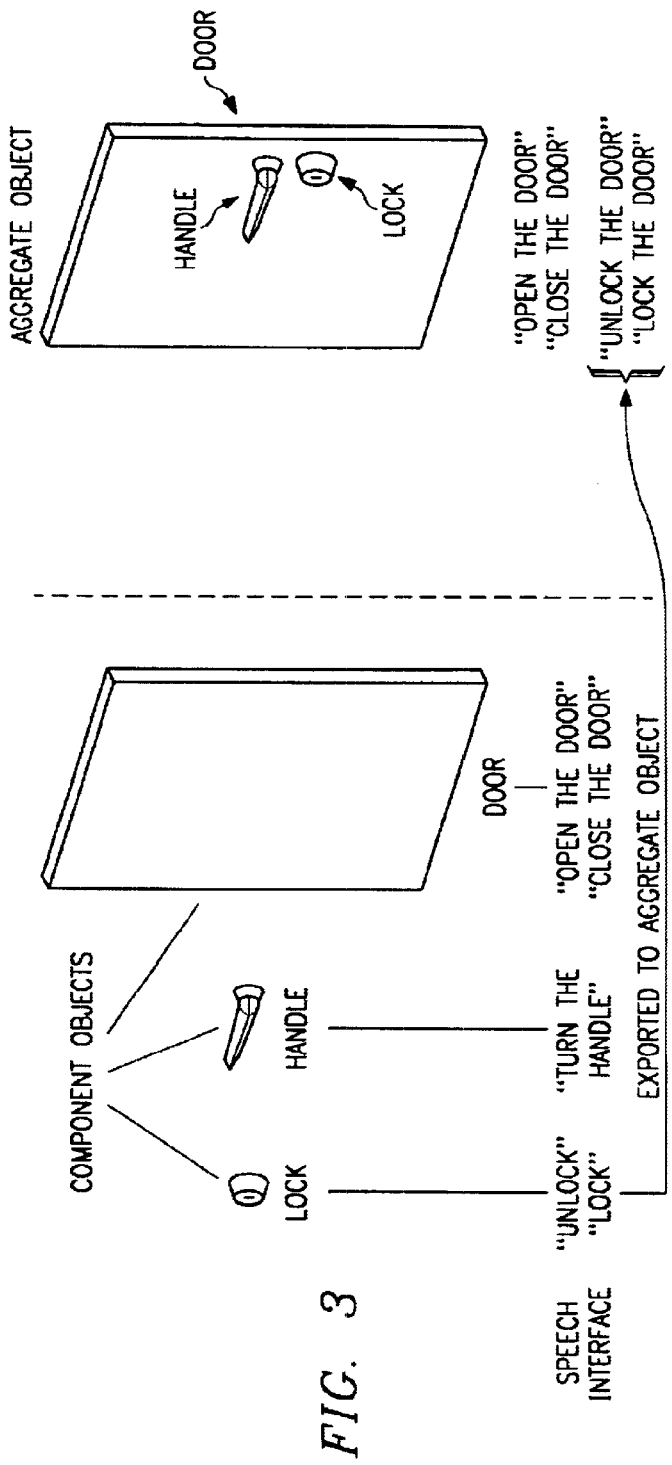
FIG. 3 illustrates affordance aggregation.

Likewise, this approach uses class aggregation. For example, an object of type "door" contains objects of type "handle" and "lock". In an embodiment using speech recognition, this implies that although the door object as a whole affords a speech interface such as "open the door", the speech interfaces of its component objects (e.g., "turn the handle") are also still valid and also add other interfaces such as turn handle right or left, etc. Furthermore, specific aspects of component interfaces are "exported" to the aggregate object. Thus, a door containing a lock affords an utterance such as "unlock the door". FIG. 3 illustrates the method of aggregation of affordances. The door is a composite object.

The invention consists of object models that support virtual affordance of a variety of interaction modalities. Each interaction modality is supported through a mechanism that specifies how the particular modality is modified through inheritance, aggregation, etc. With such a mechanism, support for multiple modalities such as visual, speech and gesture are possible.

The models may be implemented in the form of a toolbox containing a set of objects for a particular domain. Creating a world with advanced interfaces is a matter of populating a virtual environment with the desired objects from the toolbox. Since the objects themselves afford the needed interfaces, creating separate mechanisms for interaction is not necessary. Thus, the toolboxes enable rapid creation of complex, dynamic virtual environments.

The manner in which objects afford their interfaces can also be parameterized according to the participants in the virtual environment. This is in agreement with the meaning of "affordance" in cognitive psychology, where each perceiver in the environment can receive different affordances from the same object, depending on the species of the perceiver. See "The Ecological Approach to Visual Perception" by James J. Gibson published by Houghton Mifflin Boston, Mass., 1979. When in the proximity of an object, the viewer passes to the object a description of his role in the environment, such as his capabilities, interests, task, area of expertise, or level of authority. This information is used as a parameter to a function that tailors the afforded interfaces appropriately. In this manner, the method of virtual affordances supports the role-dependent visualization and manipulation needed for intelligent collaboration and visualization.

Figure 4:
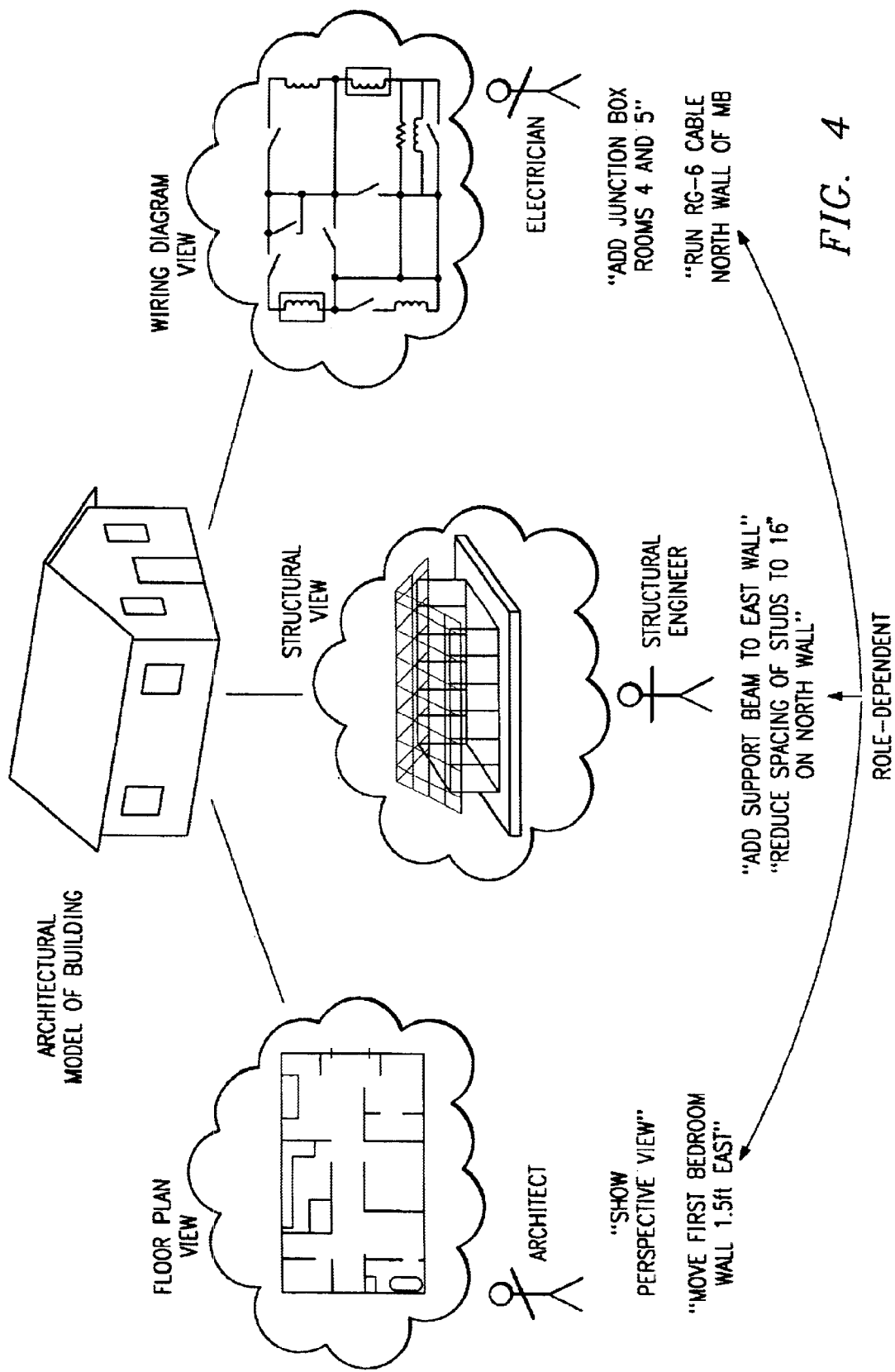
FIG. 4 illustrates a role dependent speech interface system.

FIG. 4 shows an embodiment of the invention where speech interfaces are supported. Here, different participants in a collaborative virtual environment are viewing an architectural model of a building. The visual and speech interfaces afforded by the model are dependent on the roles of the participants. For example, when the electrician is viewing the architectural model, only the grammars pertaining to his vocabulary of interest (e.g., "add a junction box in room 4", "run RG-6 cable down east wall") are active in the speech recognizer. When the structural engineer or the architect is interacting with the model, the grammars pertaining to his vocabulary are loaded into the recognizer instead. For example, the structural engineer might recite "add support beam to east wall" or "reduce spacing of studs to 16 on north wall". The architect view might be as shown and his grammars might recognize for the architect "show perspective view" or "move first bedroom wall 1.5 feet back".

Further, when the participants are viewing a particular room of the building, only the objects in that room are active; that is, the participants can interact with the objects that are in close proximity to them. As they move from room to room, the set of active virtual objects changes accordingly.

The role-dependent grammars result in higher recognition accuracy than could be obtained with larger, more general grammars. Since the recognizer is speaker-independent, there is no need for retraining on previously unknown speakers. Since the recognition is constrained by grammars and uses phonetic models, it can be made vocabulary-independent as well, and does not require retraining for new vocabularies. This enables participants in this collaborative virtual environment to use a speech interface that is customized to their needs. Further, the role-dependent visual interfaces make it easier for the participants to concentrate on just their area of expertise and ignore other details extraneous to their role in the environment. This is also useful in a military environment whereby role, rank or security can be the restrictions.

Figure 5:
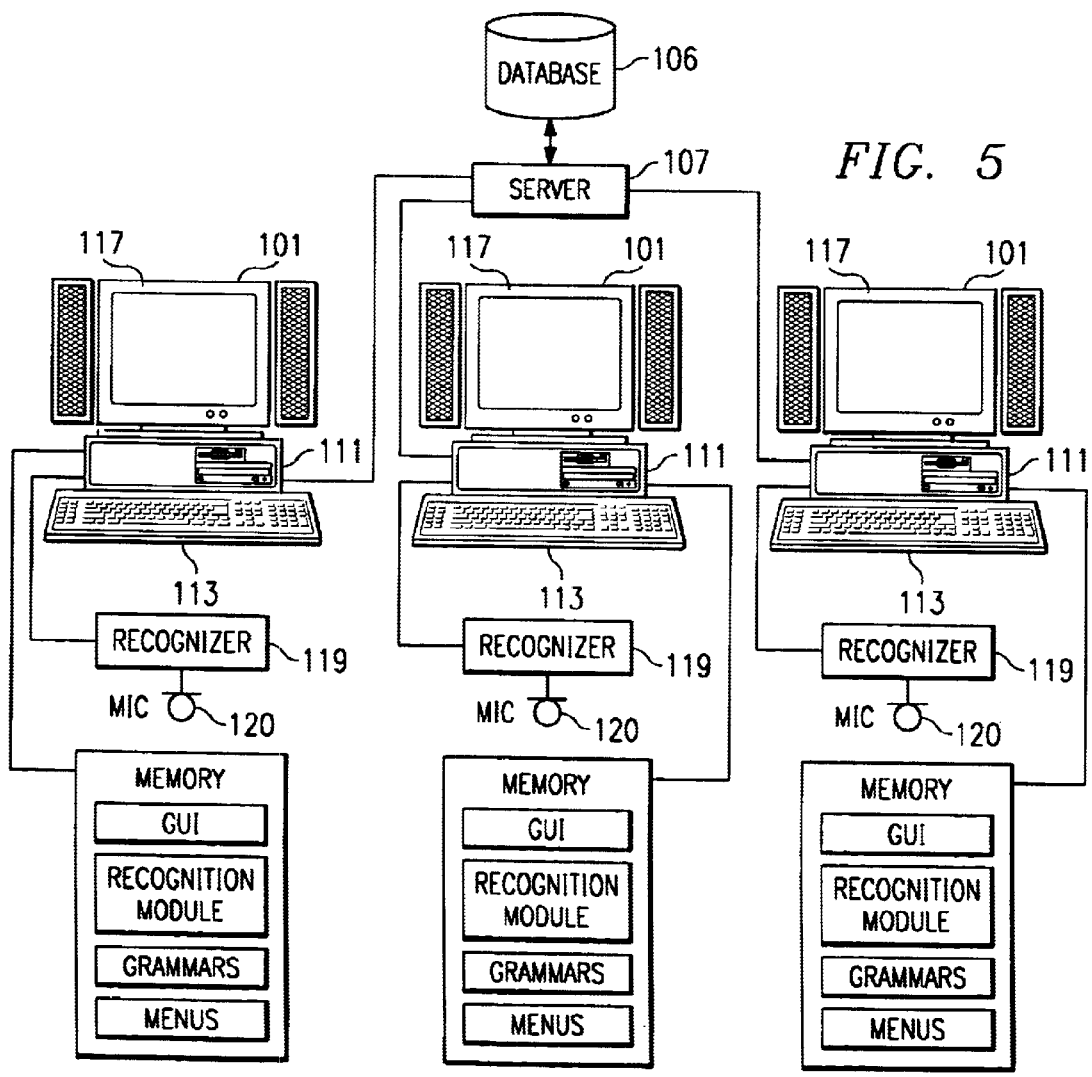
FIG. 5 is a block diagram of a role dependent system.

FIG. 5 is a block diagram of a virtual reality system for the arrangement of FIG. 4. There is a separate computer 101 with a processor 111 and display monitor 117 for the architect, structural engineer and electrician. They may be at different geographic locations all interacting with the same database 106 sending and receiving messages under a given protocol. Each computer 101 also includes a microphone 120 and a speech recognizer (Rec) 119 and local memory for generating the display and storing grammars Based on his or her role, each user sees a certain set of virtual objects and speech grammars associated with them. The user interacts with his or her set of virtual objects using a browser such as VRML browser. The communication between computer 101 and the database 106 can be provided by the Internet. These virtual environment models can be implemented in an object-oriented programming language (such a Java, C++, or Smalltalk) such that the semantics of inheritance and aggregation operations for a particular interface modality may be explicitly defined. These virtual environment models may be used to define new classes of objects for use in a collaborative virtual environment.

Suppose one wanted to define a new type of box object for use within a virtual environment. Assuming that definitions for "box" and "lock" objects already existed, one could combine these type definitions to create a new object type representing a lockable box. The following Java code fragment declares LockBox to be a new class of objects derived from the base class VeObject. Class VeObject provides the infrastructure to support affordance of the interfaces needed by LockBox.

Class LockBox Extends VeObject

A LockBox object is a type of "box" that includes a "lock" object. Class LockBox declares these relationships in the static portion of its class definition:

```
class LockBox extends VeObject
(
    static {
        derived_from(Box):
        includes(Lock);
    )
)
```

The operations derived_from ( ) and includes ( ) are provided by VeObject. The mechanisms for inheritance and aggregation in virtual affordances can thus be implemented in a more flexible manner than would be provided through the Java language semantics alone. For example, suppose the default aggregation semantics for visual interfaces provided by VeObject would cause a Lock object to appear on top of the visual representation of a Box when creating a LockBox. If instead one wanted the lock on the front of the box, the semantics of the aggregation mechanism for visual interfaces could be redefined. In the code fragment below, LockBox overrides the function visualAggregationSemantics ( ) provided by VeObject. When the operation includes (Lock) is performed, the function visualAggregationSemantics ( ) in Lockbox will place the lock on the front of the Box instead.

```
class LockBox extends VeObject
(
    static {
        derived_from(Box);
        includes (Lock);
    }
    static visualAggregationSemantics (VeObject v)
```

```
    {
        // Code to handle aggregation of objects of various types.
        ...
    }
}
```

After all the supported interfaces are defined for LockBox, an object of this type may be instantiated in a virtual environment and viewed via a particular browser:

```
Virtual Environment ve;
Browser b1;
...
LockBox lb1 = new LockBox();
    Instance-specific properties of lb1 may be set here.
Ve.add(lb1);
    Other objects may be added to the VE here.
b1.view(ve);
```

The browser b1 may then obtain descriptions of all the interfaces afforded by LockBox:
    1b1.affordInterfaces (b1);
This mechanism is parameterized by the browser's type, so interfaces appropriate to the particular browser can be obtained. If the browser supports speech recognition, grammars in the format appropriate for the browser's speech recognizer will be afforded. In the case of visual interfaces, graphical object descriptions (e.g., in VRML or the Java AWT) will be afforded depending on the browser's display capabilities. Thus, the virtual environment will be accessible through both hand-held, 2-D capable devices as well as browsers with 3-D displays.

The VE object models can be built in any object-oriented language (Java, C++, SmallTalk, etc.). In a preferred embodiment of the invention, Java is used because it provides the following advantages:

Java program code is machine independent, and is designed to run in an identical manner on target platforms ranging from embedded systems to high-end workstations. This facilitates access to collaborative virtual environment from client platforms with diverse capabilities.

Java includes networking support in its standard APIs. This facilitates collaborative VEs with distributed clients.

Java allows run-time class loading. This allows new VE objects to be defined and used "on the fly".

Java has emerging or standardized support for object serialization (to enable "persistent" objects), remote method invocation (for distributed object interaction), and interfacing with VRML.

Texas Instruments has developed a Java Speech API to support speech recognition in network-based Java programs. This is described in U.S. application Ser. No. 08/943,711 filed Oct. 31, 1997 of Baker et al. entitled "System and Method for Adding Speech Recognition Capabilities to Java." This application is incorporated herein by reference.

Using Java's object serialization facilities, one can assemble a number of object models into an example "toolkit" for creating collaborative virtual environments in a particular task domain. The object models contain both visual interfaces (using VRML), and speech recognition interfaces (using TI's Java Speech API). The toolkit demonstrates the mechanisms for virtual affordance and the ease of using such toolkits for construction of collaborative VE systems.

Creating a virtual world with advanced interfaces is a matter of populating a virtual environment with the desired objects from the toolkit. Since the objects themselves afford the needed interfaces, creating separate mechanisms for interaction is not be necessary. Furthermore, the toolkit implementation technology (e.g., Java, VRML, and Java Speech API) is scaleable and multi-platform, allowing the VE system to run on different client hardware. Thus, the toolkits enable rapid creation of flexible collaborative virtual environments that permit access via browsers with diverse capabilities.

The speech recognizer used in this invention has the following characteristics:

supports continuous, speaker independent, phonetic models for telephone or microphone speech, processes speech in real time, can find separate scores for multiple start hypotheses, can dynamically change the start hypotheses depending on context, can accommodate dynamic grammar addition and replacement, and includes an Application Program Interface (API) for embedding in applications.

These features, particularly the dynamic addition and replacement of grammars and the ability to process speech in real time, are essential for speech interfaces to be encapsulated within virtual objects. A description of the dynamic addition and replacement of grammars is found in U.S. application Ser. No. 08/419,226 filed Apr. 10, 1995 of Charles Hemphill entitled "Speaker Independent Dynamic Vocabulary and Grammar in Speech Recognition." This application is incorporated herein by reference.

What is claimed is:

1. A multi-user, multiple role-dependent collaborative virtual environment representing a physical object comprising:

a storage of multi-user, multiple role-dependent sets of virtual objects each representing role-dependent views of said physical object wherein each virtual object has different virtual object interfaces that are role dependent; said storage stores information about possible interactions with said virtual environment objects as attributes inside said virtual objects along with graphical information describing the virtual object's visual appearance;

a separate role-dependent display for each role-dependent set of virtual objects representing said views and role-dependent user input means for each set of virtual objects; and a processor coupled to said storage and said separate role-dependent display for said each role-dependent set of virtual objects representing said views and responsive to role of user and role-dependent user input means for providing a role-dependent display of virtual objects dependent on the role of said user.

2. A multi-user, multiple role-dependent collaborative virtual environment system comprising:

a storage of multi-user, multiple role-dependent sets of virtual objects each representing role-dependent views of a given object wherein each virtual object has different virtual object interfaces that are role dependent; said storage stores information about possible interactions with said virtual objects as attributes inside said virtual objects along with graphical information describing the virtual object's visual appearance;

a separate role-dependent display for each role-dependent set of virtual objects representing said views and role-dependent user input means for each set of virtual objects;

a processor coupled to said storage and said separate role-dependent display for said each role-dependent set of virtual objects representing said views and responsive to role of user and role-dependent user input means for providing a role-dependent display of virtual objects dependent on the role of said user and said role-dependent input means includes a speech recognizer coupled to said processor responsive to role-dependent speech commands and said role-dependent storage includes speech grammars as attributes in said virtual objects.

3. The system of claim 2 wherein said objects inherit function properties from other classes through inheritance and aggregation.

* * * * *